US009611024B2

(12) United States Patent
Greiner et al.

(10) Patent No.: US 9,611,024 B2
(45) Date of Patent: Apr. 4, 2017

(54) BALLONET MEASUREMENT SYSTEM (75) Inventors: Douglas H. Greiner, Stevenson Ranch, CA (US); Brian T. Holm-Hansen, Lancaster, CA (US); John P. Morehead, Santa Clarita, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 614 days.

(21) Appl. No.: 13/197,713

(22) Filed: Aug. 3, 2011

(65) Prior Publication Data

US 2013/0035894 A1 Feb. 7, 2013

(51) Int. Cl.
*B64B 1/00* (2006.01)
*G01F 17/00* (2006.01)

(52) U.S. Cl.
CPC ............... *B64B 1/00* (2013.01); *G01F 17/00* (2013.01)

(58) Field of Classification Search
CPC .................................. G01F 17/00; B64B 1/00
USPC .......................................................... 702/55
See application file for complete search history.

(56) References Cited

U.S. PATENT DOCUMENTS

| | | | | |
|---|---|---|---|---|
| 2,888,675 | A | * | 5/1959 | Pratt ...................... H01Q 15/20 244/31 |
| 3,153,878 | A | * | 10/1964 | Smith, Jr. ............... A63H 27/10 126/569 |
| 4,482,110 | A | | 11/1984 | Crimmins, Jr. |
| 4,696,444 | A | | 9/1987 | Regipa |
| 5,090,637 | A | * | 2/1992 | Haunschild ............... B64B 1/58 244/134 R |
| 5,117,344 | A | * | 5/1992 | Perez ...................... A63H 27/10 362/190 |
| 5,251,482 | A | | 10/1993 | Bates et al. |
| 5,645,248 | A | | 7/1997 | Campbell |
| 5,713,536 | A | | 2/1998 | Bata |
| 6,386,480 | B1 | | 5/2002 | Perry et al. |
| 6,607,163 | B2 | | 8/2003 | Perry et al. |
| 7,866,601 | B2 | | 1/2011 | Balaskovic |

(Continued)

FOREIGN PATENT DOCUMENTS

CN 201413219 Y 2/2010

OTHER PUBLICATIONS

Hunter, "Mapping with 3D lasers," PositionIT (Sep./Oct. 2007), pp. 54-57.*

(Continued)

*Primary Examiner* — Hyun Park
*Assistant Examiner* — Liam R Casey
(74) *Attorney, Agent, or Firm* — McDermott Will & Emery LLP (57) ABSTRACT

Systems and methods for measuring a volume of a ballonet are provided. In some aspects, the system may include a plurality of sensors configured to transmit a plurality of signals toward an interior surface of the ballonet and to receive the plurality of signals reflected off of the interior surface of the ballonet, a distance calculating module configured to calculate a plurality of distances from the plurality of sensors to the interior surface of the ballonet using the received plurality of signals, and a mapping module configured to create a three-dimensional surface using the calculated plurality of distances. The system may further include a measurement module configured to calculate the volume of the ballonet using the three-dimensional surface.

30 Claims, 10 Drawing Sheets

(56) References Cited

U.S. PATENT DOCUMENTS

| | | | |
|---|---|---|---|
| 2005/0180889 A1* | 8/2005 | Martin | G01N 21/05 422/83 |
| 2006/0044544 A1* | 3/2006 | O'Loughlin | G01C 3/08 356/4.01 |
| 2007/0104746 A1* | 5/2007 | Fujii | A61K 8/494 424/401 |
| 2009/0152391 A1 | 6/2009 | McWhirk | |
| 2010/0230533 A1 | 9/2010 | Greiner | |
| 2011/0101692 A1* | 5/2011 | Bilaniuk | B64B 1/10 290/44 |

OTHER PUBLICATIONS

Holz et al. "Towards Semantic Scene Analysis with Time-of-Flight Cameras" In Proceedings of RoboCup International Symposium Singaposre, Jun. 2010. pp. 1-12.*

Tornslev, "3D scanning using multibeam laser," Technical University of Denmark, Lyngby, Denmark (2005), p. 14.*

* cited by examiner

BALLONET MEASUREMENT SYSTEM

STATEMENT AS TO RIGHTS TO INVENTIONS MADE UNDER FEDERALLY SPONSORED RESEARCH OR DEVELOPMENT

Not Applicable.

FIELD

The present invention generally relates to a ballonet measurement system and, in particular, relates to a ballonet volume measurement system.

BACKGROUND

Determining the volume of air inside a ballonet of an airship is critical to flight safety and meeting FAA requirements for monitoring vehicle heaviness on transport airships. Traditional means of determining ballonet state on airships and aerostats are crude at best, relying upon crew members' visual inspection of the ballonet with few points of reference. The assessment is based upon the skill and experience of the crew. This approach lacks reliability and accuracy because of both, the difficulty in assessing the changes in volume and the visual interference that is encountered by the crew.

Accordingly, the conventional method is not capable of determining the volume of air in the ballonet with enough reliability and accuracy to satisfy potential FAA concerns. The conventional method lack reliability, automation, and is not capable of communicating with a flight control system.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to various aspects of the subject technology, a ballonet volume measurement system is provided that solves some or all of the foregoing problems. In one aspect, the system provides a reliable and accurate ballonet volume measurement. In another aspect, the system is not dependent on a pilot's skill and therefore, removes pilot induced errors and limitations in ascertaining the volume of the ballonet. In another aspect, the system may measure the volume in real time, automatically, and provide the volume data to a flight control system for piloting or controlling the airship. In one aspect, the system may determine a center of gravity of the ballonet and a leakage rate of the airship and/or ballonet. Coupled with other data from a flight control system, such as pressurization data, the system may determine whether a hull has been penetrated, thereby improving the safe operation of the airship.

According to various aspects of the subject technology, a system for measuring a volume of a ballonet is provided. The system comprises a plurality of sensors configured to transmit a plurality of signals toward an interior surface of the ballonet and to receive the plurality of signals reflected off of the interior surface of the ballonet. The system also comprises a distance calculating module configured to calculate a plurality of distances from the plurality of sensors to the interior surface of the ballonet using the received plurality of signals. The system further comprises a mapping module configured to create a three-dimensional surface using the calculated plurality of distances, and a measurement module configured to calculate the volume of the ballonet using the three-dimensional surface.

According to various aspects of the subject technology, a method for measuring a volume of a ballonet is provided. The method comprises transmitting a plurality of signals toward an interior surface of the ballonet, receiving the plurality of signals reflected off of the interior surface of the ballonet, calculating a plurality of distances using the received plurality of signals, creating a three-dimensional surface using the calculated plurality of distances, and calculating the volume of the ballonet using the three-dimensional surface.

According to various aspects of the subject technology, a machine-readable storage medium encoded with instructions executable by a processing system is provided to perform a method for measuring a volume of a ballonet. The instructions comprise code for transmitting a plurality of signals toward an interior surface of the ballonet, receiving the plurality of signals reflected off of the interior surface of the ballonet, calculating a plurality of distances using the received plurality of signals, creating a three-dimensional surface using the calculated plurality of distances, and calculating the volume of the ballonet using the three-dimensional surface.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology. Like components are labeled with identical element numbers for ease of understanding.

Various aspects of the subject technology provide a system and method for measuring a volume of a ballonet using a plurality of sensors.

Determining the volume of air in a ballonet is critical to safe and efficient operation of an airship. For example, during flight of the airship, the ballonet may be overfilled or completely emptied, thereby adversely affecting the safe operation of the airship by, for example, causing an outer envelop of the airship to collapse. Additionally, the volume of air in the ballonet can be used to determine whether the airship has achieved its maximum or minimum altitude, determine the position of the airship relative to its maximum or minimum altitude, and determine whether the airship has sufficient helium before becoming airborne. Conventional airship systems are limited to providing pressure data to the pilot. Without volume data, the pilot is unable to determine whether the ballonet is full or empty.

In one aspect, the ballonet volume measurement system provides a more reliable and accurate volume measurement than a convention method for measuring the volume of the ballonet. The conventional method relies on visual inspection of the ballonet by the pilot through a dome window. Accuracy of the visual inspection depends heavily on the skill and expertise of the pilot. Additionally, the pilot is typically unable to gain an unobstructed view of the ballonet thereby reducing the likelihood that a volume measurement is reliable and accurate. Accordingly, the system, according to certain aspects of the subject technology, removes pilot induced errors and limitations in ascertaining the volume of air in the ballonet.

In addition, the ballonet volume measurement system may measure the volume in real time, automatically, and provide the volume data to a flight control system for piloting the airship. In one aspect, the ballonet volume measurement system may determine a center of gravity of the ballonet and a leakage rate of the airship. Coupled with other data from a flight control system, such as pressurization data, the ballonet volume measurement system may determine whether a hull has been penetrated, thereby improving the safe operation of the airship.

Figure 1:
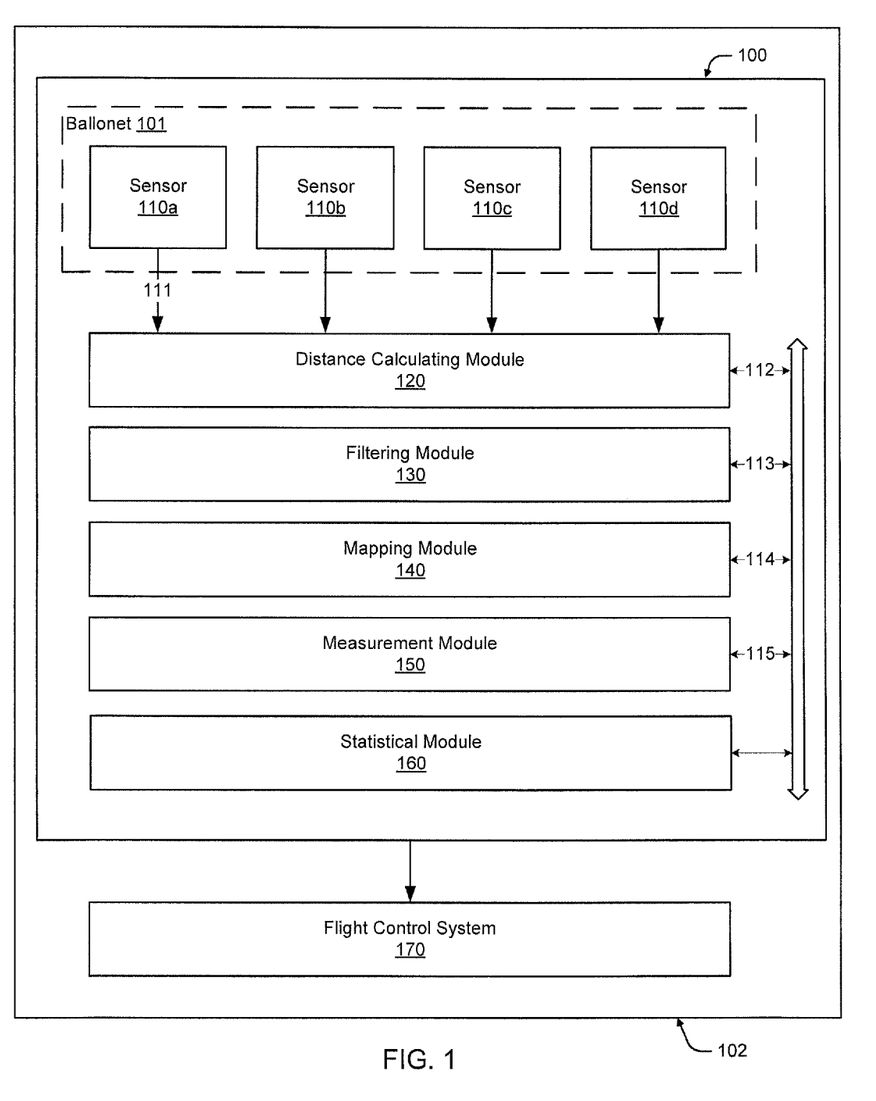
FIG. 1 is a block diagram illustrating a system for measuring a volume of a ballonet, in accordance with various aspects of the subject technology.

FIG. 1 is a block diagram illustrating a system 100 for measuring a volume of a ballonet 101, in accordance with various aspects of the subject technology. An airship 102 may comprise the ballonet 101. In some aspects, the ballonet may comprise a lightweight, translucent fabric, configured to retain and release air. The ballonet 101 assists the airship 102 in increasing and decreasing its altitude by either releasing air from the ballonet 101 or pumping air into the ballonet 101. In some aspects, referring to FIG. 3, the ballonet 310a allows helium gas inside the outer envelope 300 of the airship 102 to expand as the airship 102 increases its altitude and experiences a lower atmospheric pressure, without affecting the pressure of the outer envelope 300 of the airship 102. For example, the ballonet 310a allows the helium gas to expand into the volume once occupied by the ballonet 310a by contracting the ballonet 310a via the release of air inside the ballonet 310a. The ballonet 310a thus absorbs the helium expansion and maintains the pressure of the outer envelope 300 of the airship 102. In another aspect, the ballonet 310a allows the helium gas inside the outer envelope 300 of the airship 102 to contract as the airship 102 decreases its altitude and experiences a higher atmospheric pressure, without affecting the pressure of the outer envelope 300 of the airship 102. For example, the ballonet 310a allows the helium to contract by expanding the ballonet 310a via the pumping of air into the ballonet 310a. The ballonet 310a thus expands into the volume once occupied by the helium and maintains the pressure of the outer envelope 300 of the airship 102. In some aspects, the ballonet 310a may comprise up to 20% of the outer envelop of the airship 102. In one aspect, the airship 102 may have more than one ballonet. For example, the airship 102 may comprise a front and rear ballonet, 310a and 310b respectively, as shown in the example in FIG. 3.

Referring to FIG. 1, the ballonet 101 may comprise a plurality of sensors 110a-d disposed internally, on a lower portion of the ballonet 101. For example, referring to FIG. 5, the plurality of sensors 110a-b may comprise a plurality of sensors (e.g., 30 sensors) disposed in an array along the lower interior surface of the ballonet 310a. In some aspects, the lower portion of the ballonet 310a may be sufficiently rigid to securely mount and orient the plurality of sensors 110a-b onto the ballonet 310a. In one aspect, each sensor 110a-b may be configured to collect data that can be used to determine the distance of one or more points on the interior surface of the ballonet 310 from the sensor.

Figure 5:
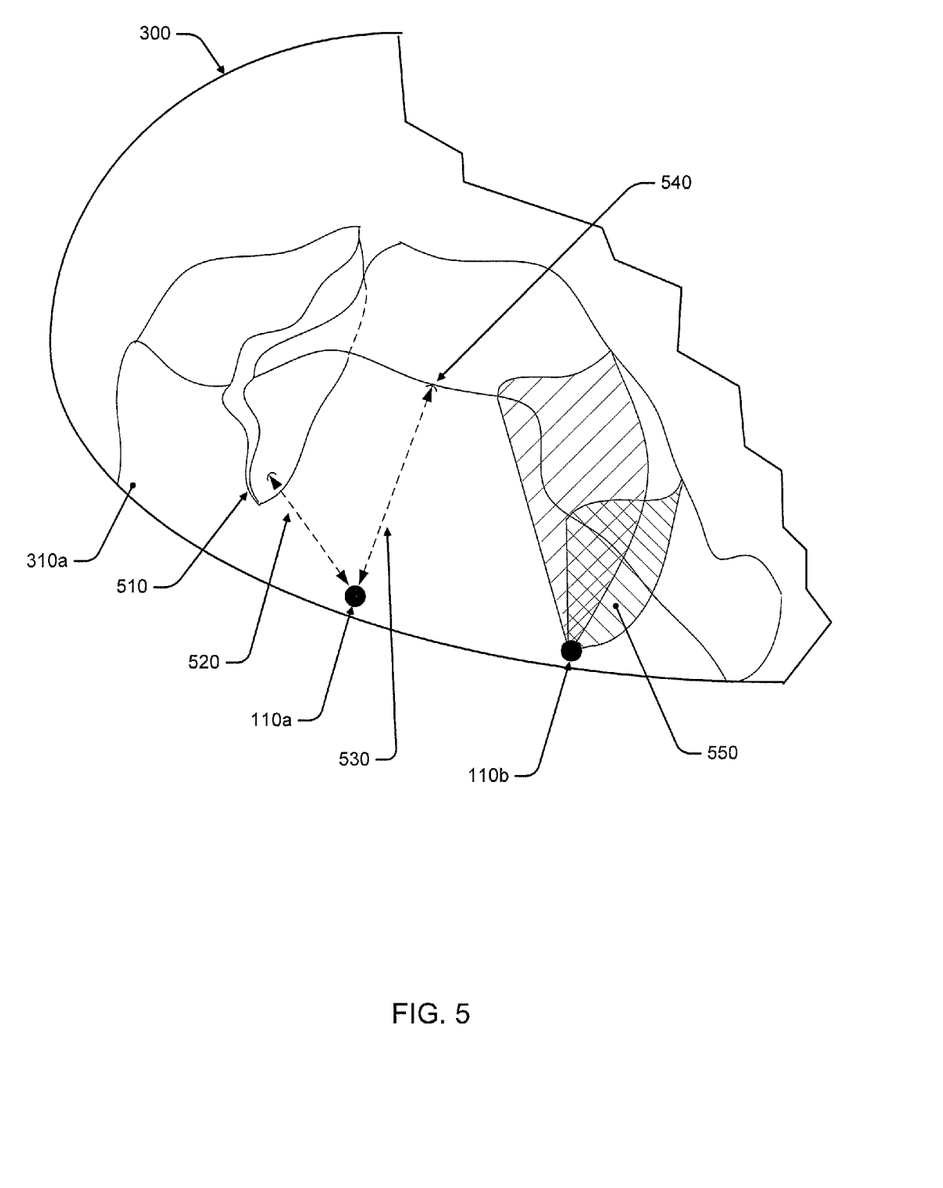
FIG. 5 illustrates a wrinkle in a ballonet, in accordance with various aspects of the subject technology.

For example, referring to FIG. 5, sensor 110a may transmit a signal 530 in a known direction towards the interior surface of the ballonet 310a. The signal 530 may reflect off of a point 540 on the interior surface and return to the sensor 110a, where the return signal 530 is detected. The time delay between transmission of the signal 530 and detection of the return signal 530 (time of travel) coupled with the speed of the signal 530 may be used to calculate the distance between the point 540 on the interior surface of the ballonet 310a and the sensor 110a. In one aspect, the sensor may scan the interior surface of the ballonet by transmitting signals in different directions and detecting the corresponding return signals in the different directions. In this aspect, the detected return signals in the different directions may be used to calculate a plurality of distances from the interior surface of the ballonet to the sensor in the different directions.

In some aspects, each sensor may comprise a laser-based sensor configured to emit a light beam to the interior surface of the ballonet and receive the return light beam reflected from the interior surface of the ballonet. In one aspect, the time of travel or an interference pattern of the light beam coupled with the speed of light may be used to calculate the distance from the sensor to the interior surface of the ballonet. In another aspect, referring to FIG. 5, the laser-based sensor 110b may perform a two-dimensional scan to obtain a cross sectional image 550 of the ballonet 310a at a fixed location. In this aspect, the sensor 110b may scan the interior surface of the ballonet 310a by steering the light beam in a circular or helical pattern and detecting the return beam in different directions as the beam is steered. The detected return beam in the different directions may then be used to determine a plurality of distances from the sensor 110b to the interior surface of the ballonet 310a in the different directions. The plurality of distances in the different directions may then be used to construct a cross sectional image of the ballonet 310a. In this aspect, the plurality of sensors may be spaced along a line (e.g., longitudinal line) on the ballonet 310a and used to obtain multiple cross sectional images of the ballonet 310a at different locations along the line. The cross sectional images may then be integrated along the line to create a three-dimensional depiction of the ballonet 310a. In other aspects, the plurality of sensors 110a-d may comprise acoustic or sonic based sensors utilizing sound waves to gather sensor data 111 by using the time of travel or the interference pattern. In another aspect, the plurality of sensors 110a-d may comprise radio frequency based or infrared based sensors configured to either capture the time of travel, interference pattern, or perform a two-dimensional scan of the ballonet 101 using radio waves or infrared waves.

Figure 2:
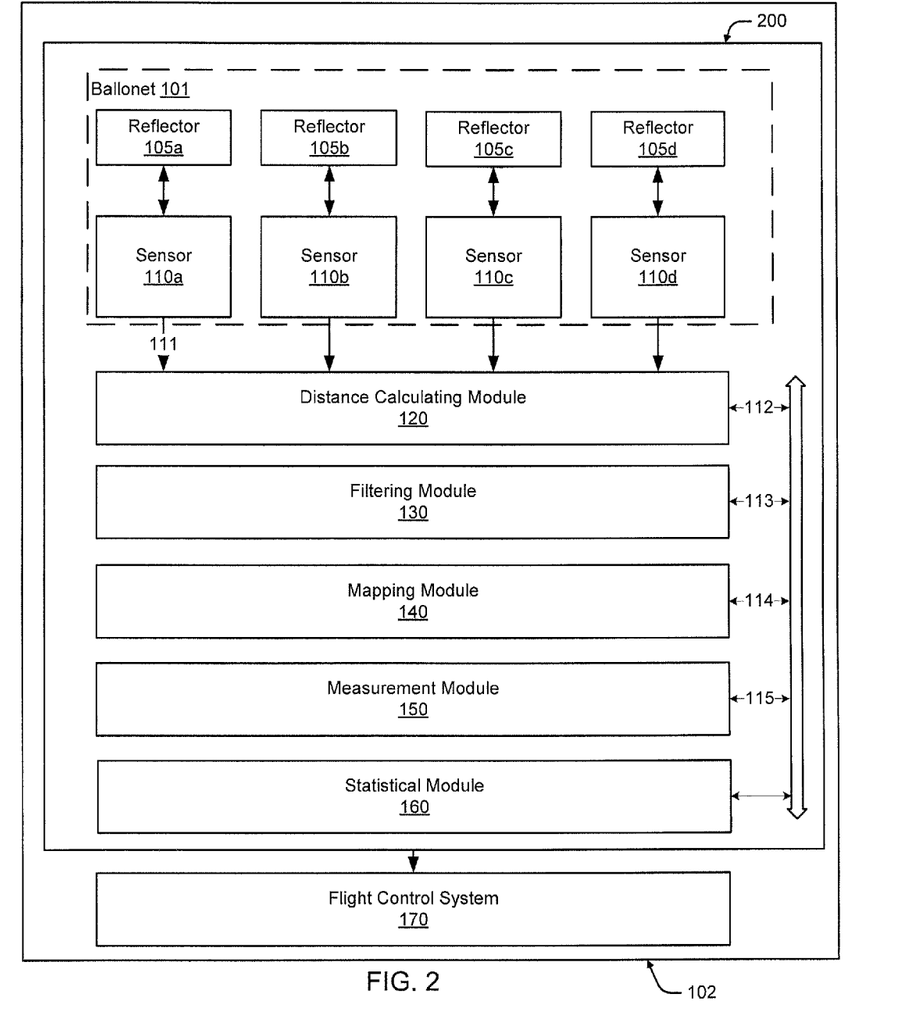
FIG. 2 is a block diagram illustrating a system for measuring a volume of a ballonet, in accordance with various aspects of the subject technology.
Figure 4:
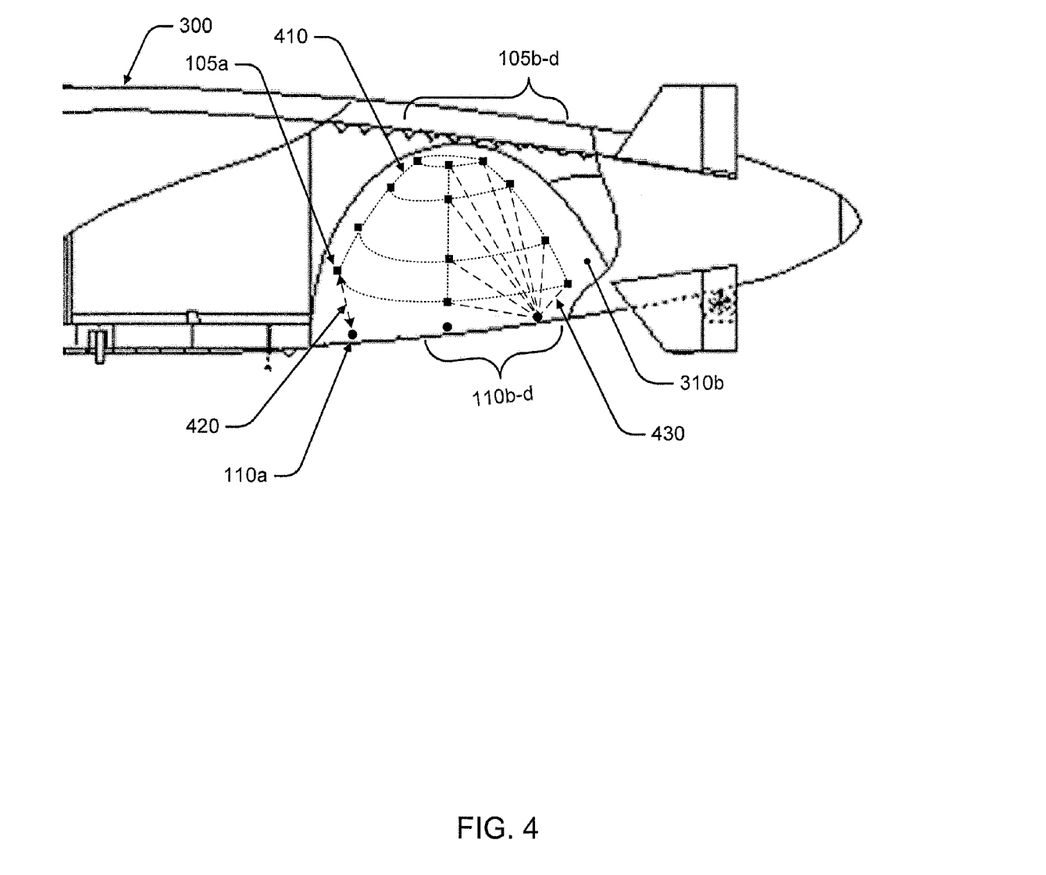
FIG. 4 illustrates a detail view of a ballonet, in accordance with various aspects of the subject technology.

Referring to FIG. 2, in some aspects, because the ballonet 101 may comprise a translucent fabric, the signals transmitted by the plurality of sensors 110a-d may travel through the ballonet 101 and not return to the plurality of sensors 110a-d. To prevent the signals from traveling through the ballonet 101 and go undetected, the ballonet 101 may further comprise a plurality of reflectors 105a-d disposed on the interior surface and an upper portion of the ballonet 101. Referring to FIG. 4, the plurality of reflectors 105a-d are configured to provide a reliable reflection of the signal 420 or 430 to the plurality of sensors 110a-d by preventing at least a portion of the signal 420 or 430 from escaping through the ballonet 310b. In this configuration, the plurality of sensors 110a-d are configured to transmit a signal 420 or 430 towards the plurality of reflectors 105a-d and the plurality of reflectors 105a-d are configured to reflect the signal 420 or 430 back towards the plurality of sensors 110a-d. In this example, the plurality of sensors 110a-d may comprise radio frequency based sensors with dedicated reflectors 105a-d. The plurality of reflectors 105a-d may be configured in an array 410, embedded within the fabric of the ballonet 310b. For example, the plurality of reflectors 105a-d may be arranged in a grid pattern along the interior surface of the ballonet 310b. In one aspect, the plurality of sensors 110a-d may be configured to transmit the signal 420 to a specific reflector. For example, the sensor 110a may transmit an individual query signal 420 to the reflector 105a and wait for a response from the reflector 105a. In another aspect, the sensor 110b-d may transmit a broad query signal 430 to a plurality of reflectors 105b-d and wait for a response from any one of the plurality of reflectors 105b-d. In this example, the sensor 110b-d may generate a cloud of points based on the reflectors 105a-d that responded to the broad query signal 430. In some aspects, the more sensors 110a-d and/or reflectors 105a-d that are disposed in the ballonet, the higher the accuracy the ballonet volume measurement system 100 is capable of achieving. For example, the ballonet volume measurement system 100 may be configured to calculate the volume of the ballonet within 1% of the total volume of the ballonet.

Referring to FIGS. 1 and 2, in some aspects, each sensor 110a-d may be configured to provide sensor data 111 (e.g., time of flight and direction of a signal) to a distance calculating module 120. In one aspect, the distance calculating module 120 may calculate a plurality of distances 112 from the plurality of sensors 110a-d to the interior surface of the ballonet 101 or the plurality of reflectors 105a-d using the sensor data 111.

According to various aspects of the subject technology, a filtering module 130 may be configured to filter the calculated plurality of distances (distance data 112), received from the distance calculating module 120. The filtering module 130 may be configured to recognize and exclude erroneous distance data, thereby increasing the accuracy and reliability of the ballonet volume measurement system 100. In some aspects, referring to FIG. 5, when the ballonet 310a is not fully pressurized, the ballonet 310a may have wrinkles, folds, or creases 510 in the ballonet fabric. As a result, the sensor 110a may receive a signal reflected off of a wrinkle, fold or crease 510, producing erroneous distance data that does not accurately reflect the volume of the ballonet. The filtering module 130 is configured to recognize and exclude erroneous distance data by, for example, performing signal processing on the distance data, and/or utilizing a low-pass filter to exclude erroneous distance data from being used to calculate a volume of the ballonet 310a. In some aspects, a wrinkle, fold, or crease 510 may cause a sharp geometric contrast between the distance data corresponding to the wrinkle, fold or cease and the other distance data, a discontinuity in the distance data, and/or a significant variation in the slope of the distance data, which may be filtered out by the filtering module 130. In other aspects, the filtering module 130 may be configured to perform error checking, or confirm the presence of erroneous distance data. For example, error checking may be performed by verifying the detection of a wrinkle, fold, or crease 510 by a first one of the sensors with the detection of the same wrinkle, fold, or crease 510 by a second one of the sensors. In this example, the distance data corresponding to the detected wrinkle, fold, or crease may be excluded from the volume calculation. In another aspect, the filtering module 120 may be configured to perform statistical checks to determine the reliability of the sensor data 111 and/or distance data 112 by comparing the sensor data 111 and/or distance data 112 with historical sensor and/or distance data. The statistical checks may assist in determining whether one of the plurality of sensors 110a-d has failed.

According to some aspects of the subject technology, a mapping module 140 may be configured to create a three-dimensional surface of the ballonet 101 based on the distance data 112 received from the distance calculating module 120. In another aspect, the mapping module 140 may be configured to create a three-dimensional surface of the ballonet 101 based on the filtered distance data 113 received from the filtering module 130. In one aspect, the mapping module 140 may construct cross sectional images of the ballonet using the filtered distance data and integrate the cross sectional images 550 into a three-dimensional depiction of the ballonet 101, as discussed above. In another aspect, the mapping module 140 may compute the locations of different points on the interior surface of the ballonet 101 using the corresponding filtered distance data 113, the known directions of the corresponding signals, and the known locations of the sensors. In this aspect, the locations of the different points on the interior surface of the ballonet 101 provide a three-dimensional depiction of the surface of the ballonet 101. In some aspects, the mapping module 140 may utilize a computer model of the ballonet 101 to optimize the three-dimensional surface of the ballonet 101.

According to other aspects of the subject technology, a measurement module 150 may be configured to calculate the volume of the ballonet 101 based on the three-dimensional surface data 114 received from the mapping module 140. For example, the measurement module 150 may compute the volume enclosed by the three-dimensional surface. In some aspects, the measurement module 150 compares the three-dimensional surface data 114 to the computer model of the ballonet 101 to calculate the volume of the ballonet 101. In some aspects, the measurement module 150 may be configured to calculate the volume of the ballonet 101 in real time. Measuring the volume of the ballonet 101 in real time may enable the ballonet volume measurement system 100 to manage the dynamics of the ballonet 101. In another aspect, the measurement module 150 may be configured to calculate the volume of the ballonet 101 in a time increment of one second or more.

In some aspects, the measurement module 150 may also be configured to determine an orientation of the ballonet 101 relative to an X-Y plane, where the X-Y plane is perpendicular to the direction of gravity. Since the airship 102 is capable of performing a pitch, roll, and yaw, the air inside the ballonet 101 may slosh or move into certain areas inside the ballonet 101. By utilizing data from the flight control system 170, such as data from gyro instrumentation providing the pitch, roll, and/or yaw of the airship 102, the measurement module 150 may determine the orientation of the ballonet 101 relative to the X-Y plane. For example, the measurement module 150 may determine the orientation of the ballonet 101 by determining the orientation of the three dimensional surface. The orientation of the three dimensional surface may be determined by determining the orientation of the plurality of sensors 110a-d. The orientation of the plurality of sensors 110a-d may be determined by using the pitch, roll, and/or yaw data from the flight control system 170 since the sensor are placed on a relatively rigid structure. Based on the orientation of the plurality of sensors 110a-d and the locations of the plurality of sensors 110a-d on the ballonet 101, the orientation of the three dimensional surface and the ballonet 101 can be determined. In other aspects, the measurement module 150 may also be able to calculate a center of gravity of the ballonet 101 by using the three dimensional surface and the determined orientation of the ballonet 101. Knowing the center of gravity of the ballonet 101 assists the pilot in launching the airship 102, operating the airship 102, landing the airship 102, and increases efficient operation of the airship 102.

In one aspect, a statistical module 160 may determine the reliability of the calculated volume of the ballonet (volume data 115). For example, the statistical module 160 may collect the volume data 115 from the measurement module 150 over a period of time and calculate an average of the volume data 115 to effectively filter out instantaneous volume changes. In other aspects, the statistical module 160 may perform statistical checks to determine the reliability of the volume data 115 by processing the volume data 115 with statistical calculations to determine the probability of error. The statistical checks may be used to determine whether one of the plurality of sensors 110a-d has failed or whether the airship 102 is undergoing extreme vehicle maneuvers/attitudes. In other aspects, the statistical module 160 may maintain the volume data 115 in a historical database to provide plots of the data over time. In one aspect, the statistical checks, coupled with the historical data, may be used to validate current volume data 115 and enunciate failures in the ballonet volume measurement system 100.

Figure 3:
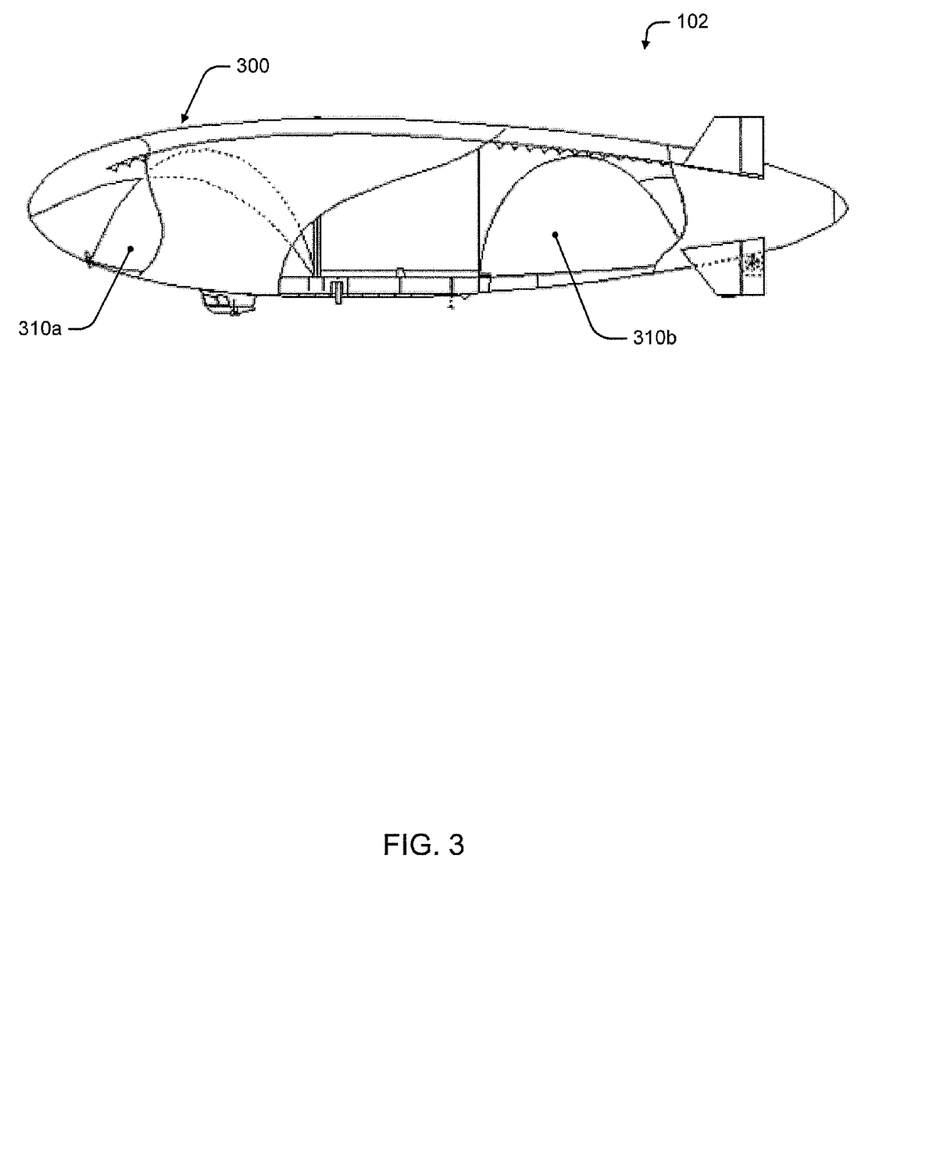
FIG. 3 illustrates an airship, in accordance with various aspects of the subject technology.

According to some aspects of the subject technology, the volume data 115 may be provided to a flight control system 170 of the airship 102 to enable the flight control system 170 to operate the airship 102 and/or provide the volume data to the pilot. In one aspect, the ballonet volume measurement system 100 routinely determines the air volume inside the ballonet 101 and automatically updates the pilot or flight control system 170 with the volume data 115. In one aspect, since the helium in the outer envelope 300 typically leaks, knowing the leakage rate of the helium increases the safe operation of the airship 102. The ballonet volume measurement system 100 may be configured to use data from the flight control system 170, along with the volume data 115, to calculate the leakage rate of the ballonet 101 and/or the airship 102 over a period of time. For example, the flight control system 170 may receive pressure and temperature readings from a pressure sensor and a temperature sensor, respectively, and communicate the pressure and temperature readings to the ballonet volume measurement system 100. The ballonet volume measurement system 100 may use the pressure and temperature readings to predict the volume of the ballonet and/or airship over a period of time due to changes in pressure and temperature based on known gas laws (e.g., Boyle's gas law). The ballonet volume measurement system may then calculate the leakage rate of the ballonet and/or airship over the same period of time by comparing the predicted volume of the ballonet with the calculated volume of the ballonet. Since the predicted volume does not take into account gas leakage, differences between the predicted volume and the calculated volume are due to leakage of air and/or gas from the ballonet and/or airship, and can therefore be used to estimate the leakage rate.

The leakage rate of the ballonet 101 may be used to determine whether the ballonet 101 and/or the outer envelope 300 of the airship 102 requires maintenance, repair, and/or replacement. For example, if the leakage rate is 200 cubic-feet/month, then the ballonet 101 and/or airship is likely in proper working condition. However, if the leakage rate is 400 cubic-feet/month, then the ballonet 101 and/or airship is likely in need of repair or replacement.

Figure 6:
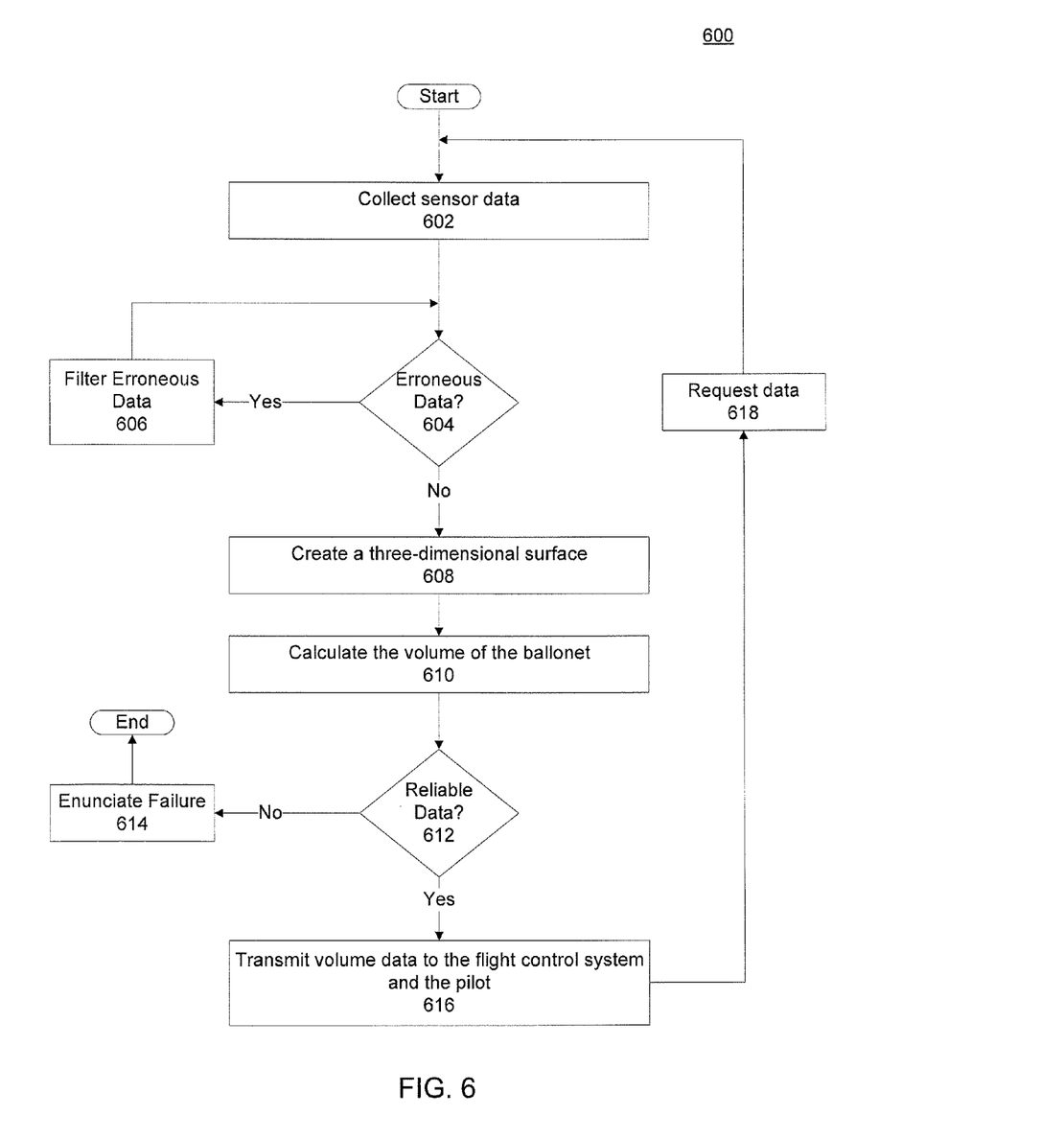
FIG. 6. illustrates an example of a method for measuring a volume of a ballonet, in accordance with various aspects of the subject technology.

FIG. 6. illustrates an example of a method 600 for measuring a volume of the ballonet 101, in accordance with various aspects of the subject technology. Method 600 may be implemented, for example, by the ballonet volume measurement system 100. Method 600 comprises transmitting a plurality of signals from a plurality of sensors 110a-d and receiving the plurality of signals reflected off of the interior surface of the ballonet 101. According to step 602, after the sensor data 111 is collected, the distance calculating module 120 calculates a plurality of distances from the plurality of sensors to different points on the interior surface of the ballonet 101 using the sensor data 111. According to step 604, if the distance data 112 contains erroneous distance data, then the filtering module 130 recognizes and excludes the erroneous distance data in step 606. According to steps 604 and 608, if the distance data 112 does not contain erroneous distance data, then the mapping module 140 creates a three-dimensional surface using the distance data 112. According to step 610, after the mapping module 140 creates the three-dimensional surface, the measurement module 150 calculates a volume of the ballonet 101 using the three-dimensional surface data 114. According to steps 612 and 614, if the volume data 115 is not reliable, then the statistical module 160 enunciates a failure to the pilot and/or flight control system 170. According to step 612 and 616, if the volume data 115 is reliable, then the volume data 115 is transmitted the flight control system 170 and/or the pilot. According to step 618, after the volume data 115 is transmitted to flight control system 170 and/or the pilot, the flight control system 170 and/or pilot requests a subsequent ballonet volume measurement. In some aspects, the subsequent volume measurement may occur in real time or at a time interval of, for example, one second. After the request for the subsequent volume measurement is transmitted, the plurality of sensors 110a-d collect sensor data 111 and the process described above is repeated.

Figure 7:
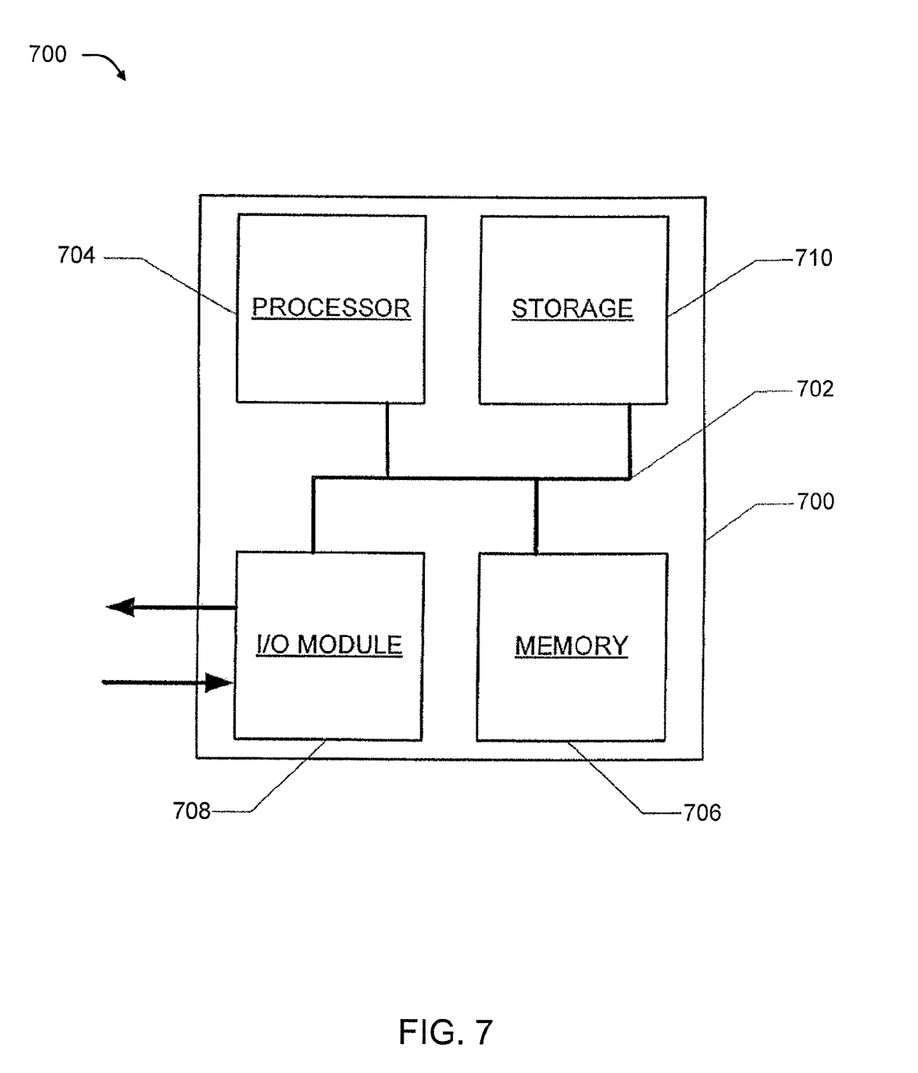
FIG. 7 is a block diagram illustrating components of a controller, in accordance with various aspects of the subject technology.

FIG. 7 is a block diagram illustrating components of a controller 700, in accordance with various aspects of the subject technology. Controller 700 comprises processor module 704, storage module 710, input/output (I/O) module 708, memory module 706, and bus 702. Bus 702 may be any suitable communication mechanism for communicating information. Processor module 704, storage module 710, I/O module 708, and memory module 706 are coupled with bus 702 for communicating information between any of the modules of controller 700 and/or information between any module of controller 700 and a device external to controller 700. For example, information communicated between any of the modules of controller 700 may include instructions and/or data. In some aspects, bus 702 may be a universal serial bus. In some aspects, bus 702 may provide Ethernet connectivity.

In some aspects, processor module 704 may comprise one or more processors, where each processor may perform different functions or execute different instructions and/or processes. For example, one or more processors may execute instructions for implementing method 600, one or more processors may execute instructions for measuring a volume of a ballonet, and one or more processors may execute instructions for input/output functions.

Memory module 706 may be random access memory ("RAM") or other dynamic storage devices for storing information and instructions to be executed by processor module 704. Memory module 706 may also be used for storing temporary variables or other intermediate information during execution of instructions by processor 704. In some aspects, memory module 706 may comprise battery-powered static RAM, which stores information without requiring power to maintain the stored information. Storage module 710 may be a magnetic disk or optical disk and may also store information and instructions. In some aspects, storage module 710 may comprise hard disk storage or electronic memory storage (e.g., flash memory). In some aspects, memory module 706 and storage module 710 are both a machine-readable medium.

Controller 700 is coupled via I/O module 708 to a user interface for providing information to and receiving information from an operator of the ballonet volume measurement system 100 and 200. For example, user interface 106 may be a cathode ray tube ("CRT") or LCD monitor for displaying information to an operator. The user interface may also include, for example, a keyboard or a mouse coupled to controller 700 via I/O module 708 for communicating information and command selections to processor module 704. The operator of the ballonet volume measurement system 100 and 200, for example, may utilize the user interface to input initialization variables (e.g., setting the pressure in the outer envelop of the airship, pressure in the ballonet, and/or weight of the airship). Although the methods described herein may be performed autonomously without a human operator, the user interface may be used by the human operator to initialize these variables prior to the launch of the vehicle.

According to various aspects of the subject disclosure, methods described herein are executed by controller 700. Specifically, processor module 704 executes one or more sequences of instructions contained in memory module 706 and/or storage module 710. In one example, instructions may be read into memory module 706 from another machine-readable medium, such as storage module 710. In another example, instructions may be read directly into memory module 706 from I/O module 708, for example from an operator of the ballonet volume measurement system 100 and 200 via the user interface. Execution of the sequences of instructions contained in memory module 706 and/or storage module 710 causes processor module 704 to perform methods to measure a volume of a ballonet. For example, a computational algorithm for measuring a volume of a ballonet may be stored in memory module 706 and/or storage module 710 as one or more sequences of instructions. Information such as the locations of the plurality of sensors, the locations of the plurality of reflectors, the sensor data, the distance data, the three-dimensional surface data, the volume data, the error levels associated with the collected data, the filter parameters, the error levels associated with the volume data, the statistical data, the historical data, the center of gravity data, the leakage rate data, and/or the orientation data may be communicated from processor module 704 to memory module 706 and/or storage module 710 via bus 702 for storage. In some aspects, the information may be communicated from processor module 704, memory module 706, and/or storage module 710 to I/O module 708 via bus 702. The information may then be communicated from I/O module 708 to an operator of the ballonet volume measurement system 100 and 200 via the user interface.

One or more processors in a multi-processing arrangement may also be employed to execute the sequences of instructions contained in memory module 706 and/or storage module 710. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium," as used herein, refers to any medium that participates in providing instructions to processor module 704 for execution. Such a medium may take many forms, including, but not limited to, non-volatile media, volatile media, and transmission media. Non-volatile media include, for example, optical or magnetic disks, such as storage module 710. Volatile media include dynamic memory, such as memory module 706. Transmission media include coaxial cables, copper wire, and fiber optics, including the wires that comprise bus 702. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

Figure 8A:
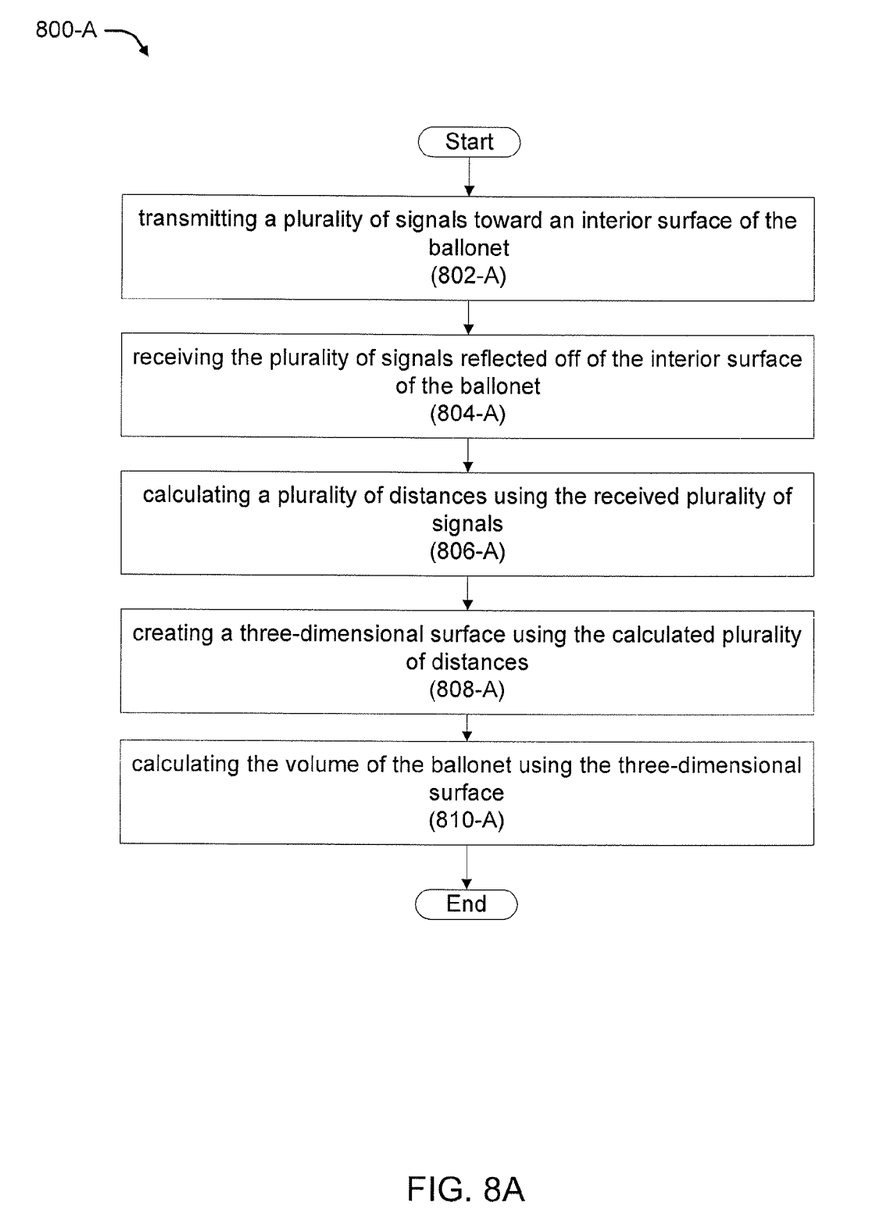
FIG. 8A illustrates an example of a method for measuring a volume of a ballonet, in accordance with various aspects of the subject technology.

FIG. 8A illustrates an example of method 800-A for measuring a volume of a ballonet, in accordance with various aspects of the subject technology. Method 800-A comprises: transmitting a plurality of signals toward an interior surface of the ballonet (802-A); receiving the plurality of signals reflected off of the interior surface of the ballonet (804-A); calculating a plurality of distances using the received plurality of signals (806-A); creating a three-dimensional surface using the calculated plurality of distances (808-A); and calculating the volume of the ballonet using the three-dimensional surface (810-A).

Figure 8B:
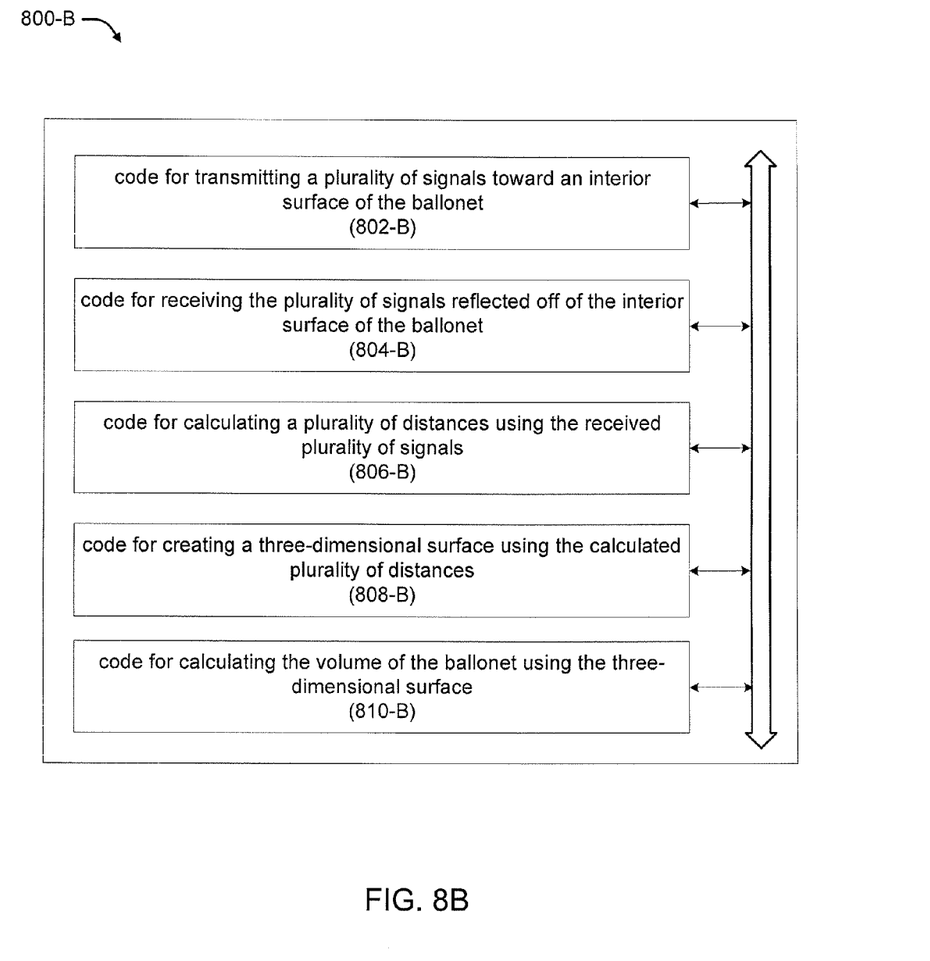
FIG. 8B illustrates an example of a machine-readable storage medium encoded with instructions executable by a processing system to perform a method for measuring a volume of a ballonet, in accordance with various aspects of the subject technology.

FIG. 8B illustrates an example of machine-readable storage medium 800-B encoded with instructions executable by a processing system to perform a method for measuring a volume of a ballonet, in accordance with various aspects of the subject technology. The instructions comprise code for: transmitting a plurality of signals toward an interior surface of the ballonet (802-B); receiving the plurality of signals reflected off of the interior surface of the ballonet (804-B); calculating a plurality of distances using the received plurality of signals (806-B); creating a three-dimensional surface using the calculated plurality of distances (808-B); and calculating the volume of the ballonet using the three-dimensional surface (810-B).

Figure 8C:
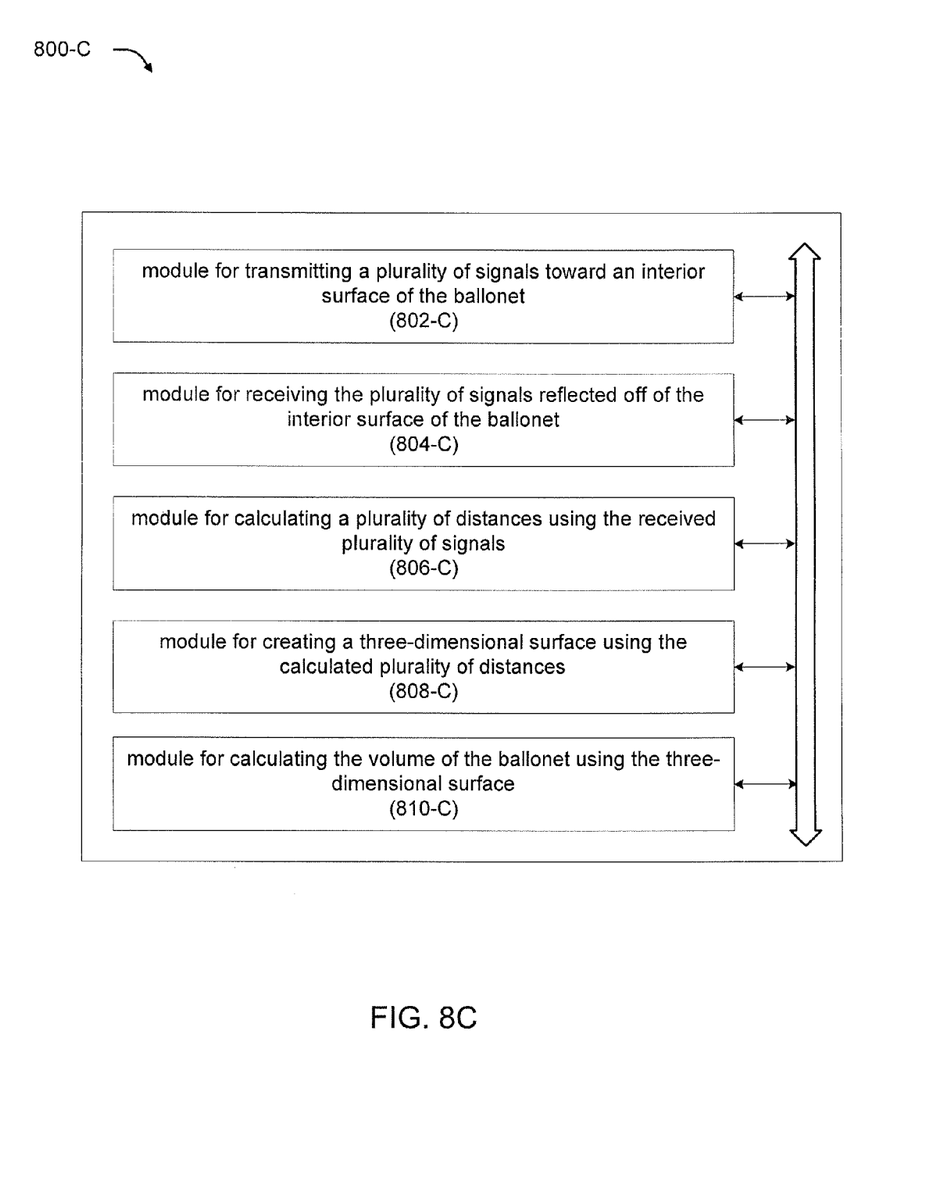
FIG. 8C illustrates an example of an apparatus for measuring a volume of a ballonet, in accordance with various aspects of the subject technology.

FIG. 8C illustrates an example of apparatus 800-C for measuring a volume of a ballonet, in accordance with various aspects of the subject technology. Apparatus 800-C comprises: module for transmitting a plurality of signals toward an interior surface of the ballonet (802-C); module for receiving the plurality of signals reflected off of the interior surface of the ballonet (804-C); module for calculating a plurality of distances using the received plurality of signals (806-C); module for creating a three-dimensional surface using the calculated plurality of distances (808-C); and module for calculating the volume of the ballonet using the three-dimensional surface (810-C).

According to certain aspects, as used herein, the word "module" refers to logic embodied in hardware or firmware, or to a collection of software instructions, possibly having entry and exit points, written in a programming language, such as, for example C++. A software module may be compiled and linked into an executable program, installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM or EEPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

It is contemplated that the modules may be integrated into a fewer number of modules. One module may also be separated into multiple modules. The described modules may be implemented as hardware, software, firmware or any combination thereof. Additionally, the described modules may reside at different locations connected through a wired or wireless network, or the Internet.

In general, it will be appreciated that the processors can include, by way of example, computers, program logic, or other substrate configurations representing data and instructions, which operate as described herein. In other embodiments, the processors can include controller circuitry, processor circuitry, processors, general purpose single-chip or multi-chip microprocessors, digital signal processors, embedded microprocessors, microcontrollers and the like.

Furthermore, it will be appreciated that in one embodiment, the program logic may advantageously be implemented as one or more components. The components may advantageously be configured to execute on one or more processors. The components include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for measuring a volume of a ballonet, the system comprising:
    a plurality of reflectors arranged in a grid pattern along a non-rigid interior surface of the ballonet and configured to reflect a plurality of signals directed at the plurality of reflectors;
    a plurality of sensors mounted on a rigid interior surface of the ballonet and configured to transmit the plurality of signals toward the non-rigid interior surface of the ballonet and to receive the plurality of signals reflected off of the plurality of reflectors while the ballonet is not fully pressurized and comprises a folded, wrinkled or creased portion of the non-rigid interior surface of the ballonet; and
    one or more processors configured to:
        calculate, while the ballonet is not fully pressurized and comprises the folded, wrinkled or creased portion of the non-rigid interior surface of the ballonet, a plurality of distances from the plurality of sensors to the plurality of reflectors using the received-plurality of signals;
        create a three-dimensional surface using the calculated plurality of distances; and
        calculate the volume of the ballonet using the three-dimensional surface.

2. The system of claim 1, wherein the plurality of sensors comprise laser based sensors.

3. The system of claim 1, wherein the plurality of sensors comprise radio frequency based sensors.

4. The system of claim 1, wherein the plurality of sensors comprise sonic based sensors.

5. The system of claim 1, wherein the one or more processors are further configured to:
    detect the folded, wrinkled or creased portion of the non-rigid interior surface of the ballonet based on comparing data received for the portion by a first sensor of the plurality of sensors with data received for the portion by a second sensor of the plurality of sensors; and
    exclude erroneous distances corresponding to the folded, wrinkled or creased portion from the calculated plurality of distances.

6. The system of claim 1, wherein the one or more processors are further configured to calculate the volume of the ballonet in real time.

7. The system of claim 1, wherein the one or more processors are further configured to calculate the volume of the ballonet in a time increment of one second or more.

8. The system of claim 1, wherein the one or more processors are further configured to calculate the volume of the ballonet within 1% of a total volume of the ballonet.

9. The system of claim 1, wherein the one or more processors are further configured to determine the orientation of the ballonet relative to a plane using the three-dimensional surface and orientation data from gyro instrumentation.

10. The system of claim 9, wherein the one or more processors are further configured to calculate the center of gravity of the ballonet using the three-dimensional surface and the determined orientation of the ballonet.

11. The system of claim 1, wherein the one or more processors are further configured to calculate a leakage rate of the ballonet by predicting the volume of the ballonet and determining a difference between the predicted volume of the ballonet and the calculated volume of the ballonet.

12. The system of claim 1, wherein the one or more processors are further configured to perform statistical checks to determine the reliability of the calculated volume of the ballonet.

13. A method for measuring a volume of a ballonet, the method comprising:
    transmitting, by a plurality of sensors mounted on a rigid interior surface of the ballonet, a plurality of signals toward a plurality of reflectors arranged in a grid pattern along a non-rigid interior surface of the ballonet;
    receiving the plurality of signals reflected off of the plurality of reflectors while the ballonet is not fully pressurized and comprises a folded, wrinkled or creased portion of the non-rigid interior surface of the ballonet;
    calculating, while the ballonet is not fully pressurized and comprises the folded, wrinkled or creased portion of the non-rigid interior surface of the ballonet, a plurality of distances from the plurality of sensors to the plurality of reflectors using the received plurality of signals;
    creating a three-dimensional surface using the calculated plurality of distances; and
    calculating the volume of the ballonet using the three-dimensional surface.

14. The method of claim 13, wherein the plurality of signals comprise light beams.

15. The method of claim 13, wherein the plurality of signals comprise radio waves.

16. The method of claim 13, wherein the plurality of signals comprise sound waves.

17. The method of claim 13, further comprising, after calculating a plurality of distances:
    detecting the folded, wrinkled or creased portion of the non-rigid interior surface of the ballonet based on comparing data received for the portion by a first sensor of the plurality of sensors with data received for the portion by a second sensor of the plurality of sensors; and
    excluding erroneous distances corresponding to the folded, wrinkled or creased portion from the calculated plurality of distances.

18. The method of claim 13, wherein the calculating the volume of the ballonet comprises calculating the volume of the ballonet in real time.

19. The method of claim 13, wherein the calculating the volume of the ballonet comprises calculating the volume of the ballonet in time increments of one second or more.

20. The method of claim 13, further comprising determining the orientation of the ballonet relative to a plane using the three-dimensional surface and orientation data from gyro instrumentation.

21. The method of claim 20, further comprising calculating the center of gravity of the ballonet using the three-dimensional surface and the determined orientation of the ballonet.

22. The method of claim 13, further comprising calculating a leakage rate of the ballonet by predicting the volume of the ballonet and determining a difference between the predicted volume of the ballonet and the calculated volume of the ballonet.

23. The method of claim 13, further comprising performing statistical checks to determine the reliability of the calculated volume of the ballonet.

24. A non-transitory machine-readable storage medium encoded with instructions executable by a processing system to perform a method for measuring a volume of a ballonet, the instructions comprising code for:
   transmitting, by a plurality of sensors mounted on a rigid interior surface of the ballonet, a plurality of signals toward a plurality of reflectors arranged in a grid pattern along a non-rigid interior surface of the ballonet;
   receiving the plurality of signals reflected off of the plurality of reflectors while the ballonet is not fully pressurized and comprises a folded, wrinkled or creased portion of the non-rigid interior surface of the ballonet;
   calculating, while the ballonet is not fully pressurized and comprises the folded, wrinkled or creased portion of the non-rigid interior surface of the ballonet, a plurality of distances from the plurality of sensors to the plurality of reflectors using the received plurality of signals;
   creating a three-dimensional surface using the calculated plurality of distances; and
   calculating the volume of the ballonet using the three-dimensional surface.

25. The non-transitory machine-readable storage medium of claim 24, further comprising code for:
   detecting the folded, wrinkled or creased portion of the non-rigid interior surface of the ballonet based on comparing data received for the portion by a first sensor of the plurality of sensors with data received for the portion by a second sensor of the plurality of sensors; and
   excluding erroneous distances corresponding to the folded, wrinkled or creased portion from the calculated plurality of distances.

26. The non-transitory machine-readable storage medium of claim 24, further comprising code for calculating the volume of the ballonet in real time.

27. The non-transitory machine-readable storage medium of claim 24, further comprising code for determining the orientation of the ballonet relative to a plane using the three-dimensional surface and orientation data from gyro instrumentation.

28. The non-transitory machine-readable storage medium of claim 27, further comprising code for calculating the center of gravity of the ballonet using the three-dimensional surface and the determined orientation of the ballonet.

29. The non-transitory machine-readable storage medium of claim 24, further comprising code for calculating a leakage rate of the ballonet by predicting the volume of the ballonet and determining a difference between the predicted volume of the ballonet and the calculated volume of the ballonet.

30. The non-transitory machine-readable storage medium of claim 24, further comprising code for performing statistical checks to determine the reliability of the calculated volume of the ballonet.

* * * * *